US009378479B2

(12) United States Patent
Seifen

(10) Patent No.: US 9,378,479 B2
(45) Date of Patent: Jun. 28, 2016

(54) LAST MILE LOGISTICS

(76) Inventor: Nader Seifen, Moorabbin Victoria (AU)

( * ) Notice: Subject to any disclaimer, the term of this patent is extended or adjusted under 35 U.S.C. 154(b) by 247 days.

(21) Appl. No.: 13/787,466

(22) PCT Filed: Feb. 21, 2012

(86) PCT No.: PCT/AU2012/000161
§ 371 (c)(1),
(2), (4) Date: Mar. 6, 2013

(87) PCT Pub. No.: WO2012/122583
PCT Pub. Date: Sep. 20, 2012

(65) Prior Publication Data
US 2013/0198042 A1 Aug. 1, 2013

(30) Foreign Application Priority Data
Mar. 17, 2011 (AU) .................................. 2011900956

(51) Int. Cl.
*G06Q 30/06* (2012.01)
*G06Q 10/08* (2012.01)
(52) U.S. Cl.
CPC .............. *G06Q 10/083* (2013.01); *G06Q 10/08* (2013.01); *G06Q 30/0635* (2013.01)
(58) Field of Classification Search
CPC . G06Q 10/08; G06Q 10/083; G06Q 10/0837; G06Q 30/0635
USPC ....................................... 705/26.81, 330, 340
See application file for complete search history.

(56) References Cited

U.S. PATENT DOCUMENTS

| 7,020,623 | B1 * | 3/2006 | Tiley et al. ................... 705/26.1 |
| 7,020,625 | B2 * | 3/2006 | Tiley et al. ................... 705/26.1 |
| 7,590,567 | B2 * | 9/2009 | Hopson et al. ............. 705/26.81 |
| 8,793,194 | B2 * | 7/2014 | Lee ................................ 705/330 |
| 2001/0042024 | A1 * | 11/2001 | Rogers ............................ 705/26 |
| 2001/0054275 | A1 * | 12/2001 | Tiley et al. ....................... 53/396 |

(Continued)

FOREIGN PATENT DOCUMENTS

NL 1017997 C * 1/2003

OTHER PUBLICATIONS

Chan, L.M.C. et al., "Probabilistic Analyses and Practical Algorithms for Inventory-Routing Models," Operations Research, Jan./Feb. 1998, vol. 46, No. 1, pp. 96-106.*
Kadison, M.L., "PackageNet Boosts Home Delivery," The Forrester Brief, Apr. 30, 1998.*

(Continued)

*Primary Examiner* — Nicholas D Rosen
(74) *Attorney, Agent, or Firm* — Margaret Millikin

(57) ABSTRACT

A logistics facility, systems and methods for the provision of goods and/or services are disclosed. According to some embodiments, the logistics facility comprises a counter or checkout for purchasing goods and/or services offered for sale at the facility and a drive through or drive up area for the collection of goods from the facility and/or for the ordering of services from the facility. The logistics facility also comprises a storage facility for receiving, consolidating and/or cross-docking goods ordered from the facility or ordered from a plurality of vendors by customers over a communications network via the customers' respective communication devices. The logistics facility also comprises a delivery service for the delivery of goods to destinations specified for the customers. The goods can include perishable goods and/or non-perishable goods and/or higher value goods and the goods are ordered for same day or subsequent delivery or collection.

21 Claims, 3 Drawing Sheets

(56) References Cited

U.S. PATENT DOCUMENTS

| | | |
|---|---|---|
| 2002/0016726 A1* | 2/2002 | Ross .................................. 705/7 |
| 2002/0016747 A1* | 2/2002 | Razumov ......................... 705/26 |
| 2002/0019785 A1* | 2/2002 | Whitman ......................... 705/28 |
| 2002/0040564 A1 | 4/2002 | Killingbeck |
| 2002/0152128 A1 | 10/2002 | Walch |
| 2002/0152140 A1* | 10/2002 | Kondo et al. .................... 705/28 |
| 2003/0036848 A1 | 2/2003 | Sheha |
| 2003/0115104 A1* | 6/2003 | Smith et al. ..................... 705/26 |
| 2003/0171996 A1* | 9/2003 | Chen et al. ...................... 705/26 |
| 2003/0172007 A1 | 9/2003 | Helmolt |
| 2003/0177072 A1 | 9/2003 | Bared |
| 2004/0193502 A1 | 9/2004 | Heitner |
| 2005/0137935 A1* | 6/2005 | Lee .................................. 705/15 |
| 2007/0136146 A1* | 6/2007 | Hopson et al. .................. 705/27 |
| 2007/0219706 A1* | 9/2007 | Sheynblat ..................... 701/200 |
| 2009/0043617 A1* | 2/2009 | Thomas ............................ 705/7 |

OTHER PUBLICATIONS

Page titled, "PackageNet 3,000 Convenient Shipping Locations Nationwide," printed Jan. 4, 2000 from Internet site www.packagenet.com.*

Page titled, "PackageNet Web Kit," printed Jan. 11, 2000 from Internet site www.packagenet.com.*

Workmon, B., "Last Mile Delivery: Forgotten, but not Gone," from AreaDevelopment Online, www.areadevelopment.com, 2009.*

Reisman, A., "Strategies for Reducing the Impacts of Last-Mile Freight in Urban Business Districts," UEP-173: Transportation Planning, Spring 2011.*

Written Opinion of the International Searching Authority, dated May 14, 2012.

Written Opinion of the International Preliminary Examining Authority, dated Aug. 29, 2012.

Written Opinion of the International Preliminary Exaiming Authority, dated Nov. 23, 2012.

* cited by examiner

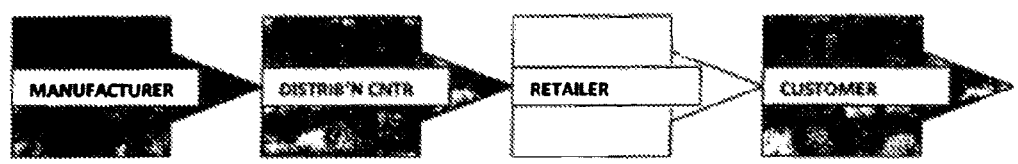
FIG 1 – PRIOR ART
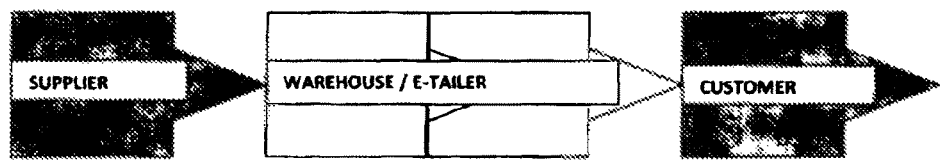
FIG 2 – PRIOR ART

LAST MILE LOGISTICS

This United States Utility Application is a National Stage Application that claims priority to PCT/AU2012/000161 filed on Feb. 21, 2012 and entitled "Last Mile Logistics" and Australian Patent Application AU 2011900956 filed on Mar. 17, 2011 and entitled "Last Mile Logistics", both of which are commonly-owned and incorporated herein in their entirety by reference.

FIELD OF THE INVENTION

The present invention relates to last mile logistics. In particular, but not exclusively, the present invention relates to a logistics facility for the provision of goods and/or services and systems and methods related thereto.

BACKGROUND OF THE INVENTION

Logistics is concerned with managing the movement of goods between a point of origin, such as a factory, and the end user, such as a customer within various time, resource and cost constraints. Logistics typically involves the integration of factors such as material handling, packaging, warehousing, inventory, transportation, information, security and financial transactions.

Last mile logistics is concerned with the final stage or stages of delivery. For example, imagine a letter posted in Marston, near Oxford in England destined for a house in Mooroopna, Central Victoria, Australia. The path for the letter is likely to be from a post box or post office in Marston to Oxford Post Office by mail van, Oxford to London Central Mail Exchange by train or road, London to Melbourne by air, Central Mail Exchange in Melbourne to Shepparton Post Office by road or rail and Shepparton to Mooroopna Regional Post Office by road. The local postman delivers the letter to its final destination on foot or by moped. The last stage of delivery by the postman is referred to as "The Last Mile Logistics". Since the logistics process includes the transportation and handling of the product, letter sorting and other processes that occur at the Mooroopna Regional Post Office can also be considered as part of the Last Mile Logistics.

FIG. 1 shows the traditional supply chain distribution model with goods moving from the supplier to a distribution centre, which can also be a warehouse or wholesaler, to the retailer and to the final customer. The role of the warehouse/distribution centre is typically a multifaceted process. According to Rushton, Croucher et al., The Handbook of Logistics & Distribution Management, 4$^{th}$ Ed., the warehouse/distribution centre acts as the following:

Inventory holding point: This is the most basic function of this type of facility. It is not unusual for the facility to be a stock holding point for several suppliers and/or manufacturers.

Consolidation centre: Customers often order a number of product lines, and would prefer a single delivery. The facility consolidates the various orders and origins into the one delivery.

Cross-dock centre: If goods are brought from elsewhere in the supply chain specifically to fulfil a customer order, then they are likely to be cross docked. This simply means that the goods are transferred across a dock from the incoming vehicle to the outgoing vehicle via the goods-in and goods-out bays without being placed into storage.

Sorting centre: This is basically cross-docking, but tends to be used for the purpose of sorting the goods to a specific region or customer.

Break-bulk point: This is where "bulk loads", be it containers, full pallets or full boxes, are broken down to smaller units for shipping to various customers or regions.

Returned goods centre: The handling of returned goods is imperative in the case of internet shopping, which tends to be associated with higher percentages of returned goods than in the case of store shopping.

Typically, a retailer or various retailers place their orders with the relevant wholesaler or distribution centre. These orders are either for physical requests by the end customer, or in anticipation of customer demand. Hence, the distribution centre is an inventory holding point as noted above. When orders are received at a distribution centre from an individual or multiple retailers, the distribution centre will aim for maximum efficiency by combining the various orders for the one location. Hence, the distribution centre is a consolidation point. Also, combining orders into logical geographic distribution locations or routes makes the distribution centre a sorting centre. The distribution centre also receives stock in pallet lots or box lots, which are broken down for on forwarding to the individual retailers in smaller lots. Hence the distribution centre conducts the break-bulk process. Finally, the distribution centre acts as the conduit between the retailer and the supply point, be it a wholesalers or a manufacturer. This conduit action includes the handling of returned or damaged goods.

With the everyday presence of the Internet and the advancement of personal computing devices including smart phones, online retailing, or e-tailing, and m-commerce, referring to transactions via mobile devices, has exploded. Many bricks and mortar stores also have an online store and many newly founded "stores" only offer their products and/or services online to reach a larger number of customers and to reduce overheads, such as rent and wages. More recently, large department stores have reduced the size of certain departments, such as electrical goods, which now offer a reduced range of goods within those departments. Other department stores have reduced in overall size or have closed altogether.

According to Monash University's Australian Centre for Retail Studies, more than half of Australian shoppers search online before purchasing from a store, and around a quarter use the internet for pre-purchase information about products, followed by those who use brochures/catalogues, product inspections, word-of-mouth and in-store service. Further, the following research by Google was presented at the recent National Franchising Convention: By 2013, smart phone sales will overtake PC sales; By 2014, the number of mobile Internet users will exceed desktop Internet users; 28% of Australians use a smart phone; In the period 2009 to 2014 the number of mobile users paying for goods and services using their mobile phones will grow by 600%. Australia traditionally follows the trends of the developed economies of western Europe and the USA.

The traditional supply chain distribution model shown in FIG. 1 can be compared with the supply chain distribution model for electronic commerce, shown in FIG. 2. One difference is that there is no need for a retail front, hence the often used term "clicks and mortar" rather than "bricks and mortar" for the traditional retailing. In an e-tailing environment, the retailer interface is removed. This means that the inventory holding point, consolidation, cross-docking, break-bulk processes are all handled by the e-tailer, or these functions are subcontracted to a distribution centre. Sorting of the goods may be done by the e-tailer or by the distribution centre.

The anticipated growth in electronic commerce will mean that the current distribution models will not be the most efficient to satisfy the customer demand. Examples that illustrate this follow.

In a first example, consumer "A" places an order for an expensive watch through a reputable web site. Under current practice, the website would directly dispatch the item to the purchaser's address, typically using a courier service or the regular postal system. If there is no one at home to sign for the parcel upon receipt, the item is taken back to the nearest Post Office or distribution centre for the courier. A calling card is left for the consumer to collect the item, or typically a redelivery fee applies if redelivery is requested. Handling of valuables creates an inconvenience in that consumer "A" has to be present at the time of delivery; otherwise, delivery is not complete.

In a second example, consumer "B" is a rather busy person and regularly shops for groceries over the internet. Typically, the items ordered include meat, fish and vegetables. Under current practice, the website would deliver the order in polystyrene containers at an unspecified time. If consumer "B" is present at the time of delivery; then the delivery is complete. However, if consumer "B" is not at home, the polystyrene container is left outside the residence. The issues here are ones of security, where there is no spot to hide the box from the attention of passersby, or lack of access where security gates are installed. Also, in warm climates, the polystyrene containers may be insufficient to control the temperature of the perishable items.

Alternatively, the order may be delivered within a specified delivery window. For example, an am or pm delivery can be specified. This provides more flexibility for the delivery service, but is inconvenient for the consumer because they only have a vague idea of when their order will be delivered and must wait until it is delivered if the aforementioned problems are to be avoided. Shorter delivery windows are sometimes offered, such as a 3 hour, 2 hour or 1 hour delivery window. Whilst this is more convenient for the consumer, a delivery fee is usually levied commensurate with the specificity of the delivery window. Another problem is that shorter delivery windows are not always offered on all days of the week or at short notice, such as for next day delivery or even for delivery the day after tomorrow. Furthermore, shorter delivery windows increase the complexity of the delivery task for the website or delivery company, which is exacerbated with increasing numbers of orders and with shorter delivery windows.

In a third example, consumer "C" buys a T-shirt online. The T-shirt is delivered in a padded plastic bag that was of a reasonable size to squeeze into the letterbox. Consumer C arrives home and retrieves that T-shirt to find out that it is too small. Consumer "C" wants to take advantage to the Satisfaction or Return Policy offered by the website. The only way to do that is to repack the T-shirt and return it via the regular postal system or a similar delivery service. This means that consumer "C" has to make a special trip to a post office or courier depot to facilitate the return of the goods.

The above three examples clearly show that the consumer will be inconvenienced, although the available technology ought to bring about greater flexibility and convenience. Added to this inconvenience, there is inefficiency in the system. Some further examples are as follows:

Consumers "A", "B", and "C" in the examples above live in three different suburbs in the same city all within 1 kilometer from a common point along their travels. Under the present practices, there is a possibility, if not a likelihood, of three different couriers making the three different deliveries, even though they are within one kilometer from a common point.

Consumer "D" is just one consumer with all the various needs of consumers "A", "B" and "C" combined. In other words, consumer "D" needs to buy a somewhat valuable item from a first website, a bunch of groceries and perishables from a second website, and several items of clothing from a third website. With the increase in online ordering, this type of consumer "D" is likely to exist with increasing frequency. Consumer "D" is all consumers, at random. Under the present paradigms, the last mile logistics will be performed by several independent operators each attempting to solve their own individual problems for the customer and creating several interfaces that may or may not work. Within all this, deliveries can only be made during work hours, typically Monday to Friday, or within predetermined delivery windows, which include the drawbacks discussed above. Deliveries outside the work hours or during the weekend are unheard of, or typically incur extra cost. Whether or not the various interfaces work, the likely outcome is, at best, consumer "D" will not receive maximum possible efficiency. At worst, the consumer will be inconvenienced and perhaps discouraged from putting too much reliance on the on-line buying system.

Various attempts have been made to address or at least ameliorate the aforementioned problems. One well known concept is that of the drive through or drive up, where customers place their orders from their vehicle via an intercom or to service personal in a kiosk or the like. The customer collects their order from the same kiosk or a different kiosk typically on the same site. In other drive through/up arrangements, the customer is required to leave their vehicle to make their selection and purchase, typically from a limited range of product offerings due to space constraints. Therefore, whilst drive through/up arrangements avoid the need for products to be delivered to the customer and address the problem of the customer not being home at the time of delivery, drive through/up arrangements only offer a partial solution.

The drive through/up concept has been extended to include an online ordering aspect. This can address the problem of limited product range due to space constraints. However, the customer must still make the special journey, typically a return journey, to collect their order from the drive through.

The concept of pack stations is also known, which are lockers similar to postal boxes, but for goods beyond just mail and parcels. An installation typically comprises multiple lockers of various sizes and an electronic console allowing customers to access their goods from a designated locker. Customers can also leave parcels in the lockers for delivery elsewhere. The lockers can be used by delivery companies as a storage point when customers are not at home to receive their deliveries. Pack stations provide a convenient pick up and drop off point for multiple customers, reduce private shopping traffic and related parking space demands and reduce overall vehicle distances and thus pollution. However, traffic problems around the location of the pack stations and increased traffic in peak periods are experienced.

A similar concept to the pack stations has been employed by some supermarkets to enable customers to pick up their grocery orders. The lockers are refrigerated to preserve the groceries until they are collected. However, one problem with this arrangement is that customers must pick up their orders from their designated locker between certain times, which is not always convenient for customers.

The reference to any prior art in this specification is not, and should not be taken as, an acknowledgement or any form of suggestion that the prior art forms part of the common general knowledge.

OBJECT OF THE INVENTION

It is a preferred object of the present invention to provide an improved system and/or method and/or apparatus that addresses or at least ameliorates one or more of the aforementioned problems and/or provides a useful commercial alternative.

SUMMARY OF THE INVENTION

The present invention is directed to a selected modified local outlet for delivering to a customer (i) goods from a core range of products carried by the selected modified local outlet; (ii) goods from a further-extended range of products that can be unrelated to the core range of products; and (iii) goods that have been ordered directly by the customer over a communications network from one or more of a plurality of other vendors unrelated to the selected modified local outlet, the selected modified local outlet comprising:

a storage facility for receiving and storing the (i) goods; (ii) goods; and (iii) goods,
  wherein the (i) goods comprise perishable goods and non-perishable goods from a core range of products that are carried for daily consumption at an availability that is order today, deliver today at the selected modified local outlet for purchase by the customer;
  the (ii) goods comprise goods from a further-extended range of products that have been ordered directly by the customer over said communications network wherein the (ii) goods have an availability that is order today, deliver tomorrow; and
  the (iii) goods have been ordered directly by the customer over said communications network from the one or more of a plurality of other vendors wherein the (iii) goods ordered directly by the customer include the selected modified local outlet as a destination specified by the customer;
  the storage facility including a temperature controlled area for storing the perishable goods;
a counter or checkout at which the goods (i), (ii) and (iii) are received from the storage facility and delivered to the customer; and
one or both of:
  a drive through or drive up area at which the goods are received from the storage facility and delivered to the customer; and
  a delivery service, via which the goods from the storage facility are delivered to destinations specified for the customer;
wherein the selected modified local outlet is selected to be a collection point that creates the least deviation from a route input by the customer on their communication device, wherein the selected modified local outlet is selected from a plurality of modified local outlets serving their local surrounding area, wherein the automatic calculation is performed by a processor coupled to be in communication with a website or other suitable interface over a communications network for receiving orders for the (ii) goods and the (iii) goods from a customer via their communication device.

The invention further is directed to a method for delivering to a selected modified local outlet (i) goods from a core range of products carried by the selected modified local outlet; (ii) goods from a further-extended range of products that can be unrelated to the core range of products; and (iii) goods that have been ordered directly by a customer over a communications network from one or more of a plurality of other vendors unrelated to the selected modified local outlet, the method comprising:

providing the (i) goods from a core range of products that are carried for daily consumption at an availability that is order today, deliver today at the selected modified local outlet for purchase by the customer;

automatically calculating the selected modified local outlet to be a collection point that creates the least deviation from a route input by the customer on their communication device, wherein the selected modified local outlet is selected from a plurality of modified local outlets serving their local surrounding area, wherein the automatic calculation is performed by a processor coupled to be in communication with a website or other suitable interface over a communications network for receiving orders for the (ii) goods and the (iii) goods from the customer via their communication device;

receiving at the selected modified local outlet the (ii) goods from a further-extended range of products that have been ordered directly by the customer over the communications network wherein the (ii) goods have an availability that is order today, deliver tomorrow; and receiving at the selected modified local outlet the (iii) goods ordered directly by the customer over the communications network from the one or more of a plurality of other vendors wherein the (iii) goods ordered directly by customer include the selected modified local outlet as a destination specified by the customer; and providing at the selected modified local outlet the (i) goods from a core range of products; the (ii) goods from a further-extended range of products; and the (iii) goods that have been ordered directly by the customer over a communications network to the customer.

The present invention further is directed to a logistics system for delivering to a customer (i) goods from a core range of products carried by a selected modified local outlet; (ii) goods from a further-extended range of products that can be unrelated to the core range of products; and (iii) goods that have been ordered directly by the customer over a communications network from one or more of a plurality of other vendors unrelated to the selected modified local outlet, the system comprising:

a selected modified local outlet comprising:
  a storage facility for receiving and storing the (i) goods; (ii) goods; and (iii) goods,
    wherein the (i) goods comprise perishable goods and non-perishable goods from a core range of products that are carried for daily consumption at an availability that is order today, deliver today at the selected modified local outlet for purchase by the customer;
    the (ii) goods comprise goods from a further-extended range of products that have been ordered directly by the customer over said communications network wherein the (ii) goods have an availability that is order today, deliver tomorrow; and
    the (iii) goods have been ordered directly by the customer over said communications network from the one or more of a plurality of other vendors wherein the (iii) goods ordered directly by the customer include the selected modified local outlet as a destination specified by the customer;
  the storage facility including a temperature controlled area for storing the perishable goods;
  a counter or checkout at which the goods (i), (ii) and (iii) are received from the storage facility and delivered to the customer;

one or both of:
- a drive through or drive up area at which the goods are received from the storage facility and delivered to the customer;
- a delivery service, via which the goods from the storage facility are delivered to destinations specified for the customer;

a website or other suitable interface coupled to be in communication with a server computer over a communications network, the web site or other suitable interface and server computer for receiving orders for the (ii); and (iii) goods from the customer via their communication device; and a processor coupled to be in communication with the website or other suitable interface over the communications network for selecting the selected modified local outlet to be a collection point that creates the least deviation from a route input by the customer on their communication device, wherein the selected modified local outlet is selected from a plurality of modified local outlets serving their local surrounding area.

BRIEF DESCRIPTION OF THE DRAWINGS

In order that the invention may be readily understood and put into practical effect, reference will now be made to preferred embodiments of the present invention with reference to the accompanying drawings, wherein like reference numbers refer to identical elements. The drawings are provided by way of example only, wherein:

FIG. 1 is a schematic drawing illustrating a known conventional supply chain & distribution model;

FIG. 2 is a schematic drawing illustrating a known supply chain & distribution model for e-tailing or e-commerce or m-commerce;

Figure 3:
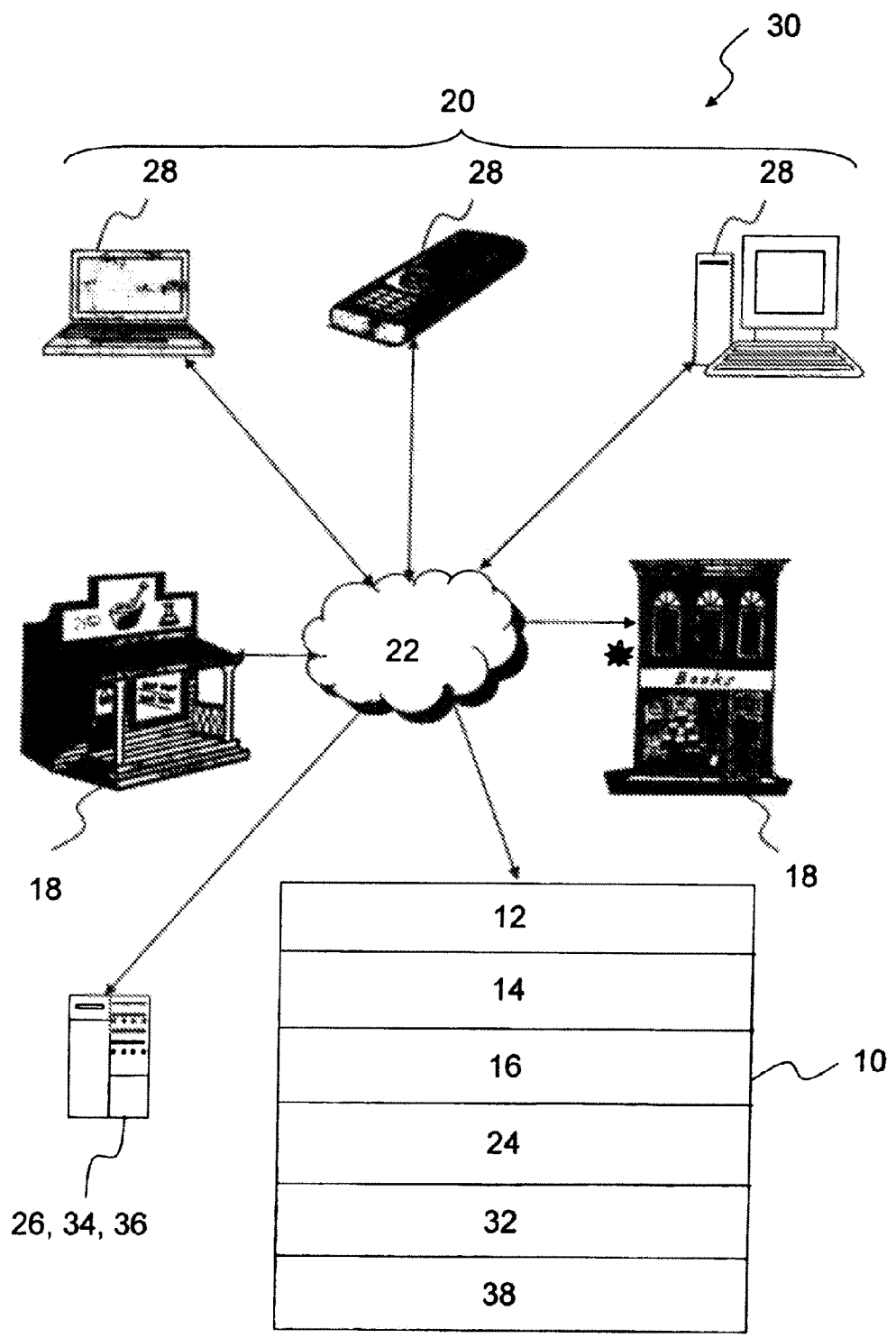
FIG. 3 is a schematic drawing illustrating a logistics facility and system for the provision of goods and/or services in accordance with embodiments of the present invention.

Skilled addressees will appreciate that elements in the drawings are illustrated for simplicity and clarity and have not necessarily been drawn to scale. For example, the relative dimensions of some of the elements in the drawings may be distorted to help improve understanding of embodiments of the present invention.

DETAILED DESCRIPTION OF THE PREFERRED EMBODIMENTS

With reference to FIG. 3, in accordance with embodiments of the present invention, a logistics facility 10 is provided for the provision of goods and/or services. Logistics facility 10 comprises a counter or checkout 12 for purchasing goods and/or services offered for sale at the facility. Logistics facility 10 comprises a drive through or drive up area 14 for the ordering and/or collection of goods from the facility and/or for the ordering of services. In some embodiments, drive through or drive up area 14 includes a window, kiosk or the like that that can enable customers to order and/or collect goods and/or services from the logistics facility without leaving their vehicle.

Logistics facility 10 also comprises a storage facility 16 for receiving, consolidating and/or cross-docking goods ordered directly from the facility 10. Storage facility 16 can also receive, consolidate and/or cross-dock goods ordered from the facility 10 and/or a plurality of vendors 18 by customers 20 over a communications network 22. For example, storage facility 16 can receive, consolidate and/or cross-dock goods ordered by customers over the internet from the websites of vendors 18 and/or from the website of the facility 10.

Logistics facility 10 can include temperature controlled areas for the storage of temperature-sensitive items, such as perishable goods.

Logistics facility 10 can include a secure storage facility for storing higher value goods. The secure storage facility can be part of the main storage facility 16. Alternatively, the secure storage facility can be a separate storage facility.

Logistics facility 10 also comprises a delivery service 24 for the delivery of goods to destinations specified for the customers and/or for the collection of goods to be returned to the logistics facility 10 and/or vendors 18, i.e. "reverse logistics". Goods can be returned because they are defective or, in the case of garments for example, the wrong size, or because the goods are undeliverable. Logistics facility 10 can include a quarantine area 38 for storing returned or undeliverable goods to be returned to the vendor 18. Quarantine area 38 can be separate from the main storage facility 16 to facilitate return of the goods to the vendor.

The goods are ordered for same day or subsequent delivery to the customer or collection from the logistics facility and the goods can include perishable goods and/or non-perishable goods and/or higher value goods, such as, but not limited to, luxury items.

In preferred embodiments, the logistics facility 10 is accommodated within a modified local outlet, such as a modified convenience store. Other examples of modified local outlets include, but are not limited to a modified shop, such as a modified shoe repair store and/or key cutting store, a modified petrol station, a modified fishing tackle store or other business. Local outlets efficiently serve their local surrounding area and at least one such outlet is typically provided per local area.

Hence, by virtue of the present invention, a convenience store operation, petrol station or the like is turned into a multi-faceted clicks and mortar online store with a traditional bricks and mortar retail operation that also conducts the last mile logistics of warehousing, consolidations, cross docking, "reverse logistics" etc. The logistics facility offers three points of customer contact being the drive through/up area 14, over the counter 12, or home deliveries 24.

With further reference to FIG. 3, another aspect of the present invention resides in a logistics system 30 for the provision of goods and/or services. The system 30 comprises the logistics facility 10 as described above comprising the counter or checkout 12, the drive through or drive up area 14, the storage facility 16 for receiving, consolidating and/or cross-docking g and the delivery service 24.

System 30 also comprises a processor 26 coupled to be in communication with the logistics facility 10 over the communications network 22 for receiving orders for goods and/or services from customers via their respective communication devices 28. The goods and/or services ordered by customers can be provided by one or more of the plurality of vendors 18 and/or one or more logistics facilities 10. Vendors 18 operate their own websites or other suitable interfaces for receiving orders from customers 20 via communications network 22 from the customers' respective communication devices 28. To facilitate the logistics facility 10 receiving orders from customers 20 via communications network 22, logistics facility 10 also comprises a website or other suitable interface 32 for receiving such orders from customers.

Where the provider is a logistics facility 10 rather than one of the vendors 18, the logistics facility nearest to the delivery point is selected as the provider of the goods and/or services ordered to maximise delivery efficiency and minimise overheads. In some embodiments, the logistics facility nearest to the delivery point can be determined by any suitable known algorithm or can be nominated by the customer.

In some embodiments, one of the logistics facilities 10 which is not the nearest to location of the customer is selected by the customer as a collection point, which can be, for example, en route in an upcoming journey for the customer. Similarly, in some embodiments, one of the logistics facilities 10 which is not the nearest to location of the customer is selected by the customer as a drop off point when goods need to be returned, as in the case of "reverse logistics". Alternatively, in such embodiments, the logistics facility 10 most convenient for the customer's upcoming journey can be automatically calculated. For example, the customer can enter a route for their journey, for example for the following day, comprising a starting point, a destination and optionally one or more further stops in their journey. The customer can select, or the system can automatically designate, the logistics facility 10 from which to collect their order, or at which they can drop off their returned goods, which causes the least deviation from the entered route.

The processor 26 can be in a server 34 coupled to and/or comprising a database 36 for storing orders from customers. The communication devices 28 can be any form of known computing device having suitable known communication and processing capabilities, such as PCs, tablets, smart phones, mobile communication devices, PDAs and the like.

Figure 4:
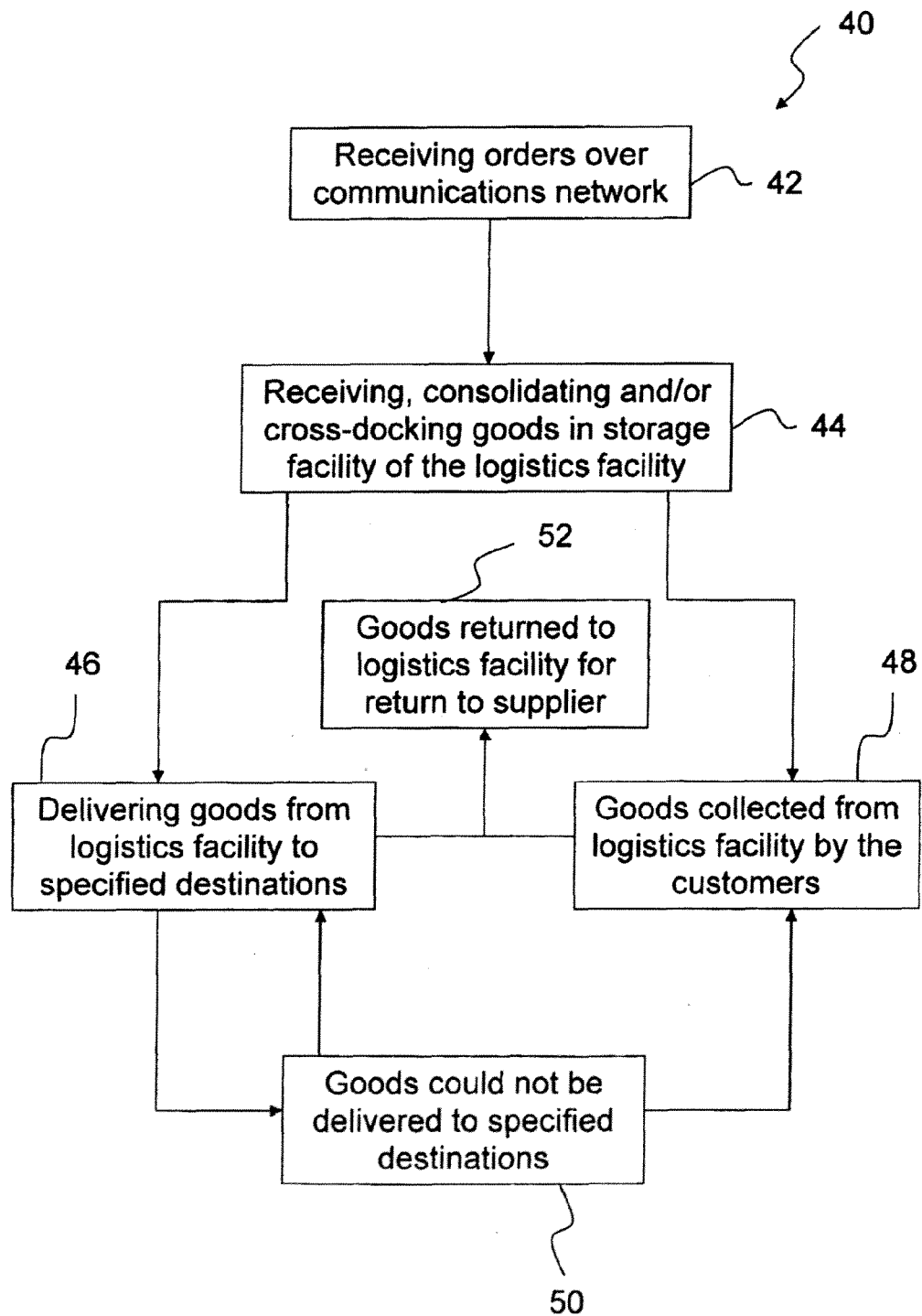
FIG. 4 is a general flow diagram illustrating a method for the provision of goods and/or services in accordance with embodiments of the present invention.

With reference to FIG. 4, another form of the present invention resides in a method 40 for the provision of goods and/or services via logistics facility 10. According to some embodiments, at 42 the method 40 includes receiving orders for goods from respective communication devices 28 of customers over communications network 22. The goods can be supplied by the logistics facility 10 and/or a plurality of vendors 18. The goods can include perishable goods, non-perishable goods and higher value goods, such as luxury goods. The goods are ordered for same day or subsequent delivery to a delivery location for the customer, which can be the customer's address, or for collection from the logistics facility 10 by the customer.

At 44, method 40 includes receiving, consolidating and/or cross-docking goods in the storage facility 16 of the logistics facility 10 to minimise the number of deliveries.

At 46, method 40 includes delivering the goods from the logistics facility 10 to destinations specified for the customers via delivery service 24 of the logistics facility 10.

Alternatively, method 40 includes at 48 delivering the goods to the customers via a drive through or drive up area 14 of the logistics facility 10, i.e. the goods are collected from the logistics facility 10 by the customer.

In some situations, with reference to step 50, where goods could not be delivered to the specified address, the method 40 includes returning the goods to the logistics facility for subsequent collection by the customer or for subsequent re-delivery, or for eventual return to the vendor 18.

In some situations, customers wish to return goods because, for example, they are the wrong size or are defective. In such situations, at 52, the method 40 includes the customers returning the goods to the logistics facility 10.

The examples described above in relation to prior art distribution channels will now be revisited with the logistics facility 10, system 30 and method 40 of the present invention.

Consumer "A" places an order for an expensive watch through a reputable web site. When consumer "A" completes the online order, he/she can nominate the nearest logistics facility 10 for the final step. The logistics facility 10 will contact consumer "A", for example via SMS, telephone or other convenient method when the goods arrive. Consumer "A" will respond with a requested delivery time and/or pick up time. Alternatively, consumer "A" may well go online, order other goods from the logistics facility 10 and choose for the watch and the additional goods to be picked-up or delivered together.

Consumer "B" is a rather busy person, and regularly shops for groceries over the internet. Typically, the items ordered include perishable goods, such as meats, fish and vegetables. The logistics facility 10 will have a core range of products that are carried for daily consumption. This range may well have one or two cuts of different meats, but usually not a full range. The same applies to fish, poultry and vegetables. However, in preferred embodiments, the logistics facility 10 offers for sale a core range of products for "order today, deliver today" and an extended range of products for "order today, deliver tomorrow". In some cases, some of the products in the extended range of products may be for delivery at a time later than "tomorrow" where a certain lead time is required to ensure timely provision of the products.

In some embodiments, the logistics facility 10 offers for sale a further-extended range of products that can be unrelated to the core range of products offered for sale by the logistics facility. For example, the further-extended range of products can include higher priced and luxury items where the core range of products is groceries. In some embodiments, the offer for sale of such further-extended range of products is provided by website or other suitable interface 32 of the logistics facility 10, which can receive orders from customers for such products. The website or interface 32 of the logistics facility 10 can provide links to the websites of the vendors 18 that provide the further-extended range of products.

Consumer "B" will elect to pick-up the products personally, for example on the way home, or have the goods delivered. The logistics facility 10 will contact consumer "B" via SMS or telephone etc. when the goods arrive. Consumer "B" will respond with a requested delivery time and/or pick up time. Alternatively, consumer "B" may well go online, order other goods from the logistics facility 10 and choose for all the goods to be picked-up or delivered together.

Consumer "C" buys a T-shirt online and the T-shirt is delivered in a padded plastic bag that was big enough to squeeze into the letterbox. Consumer "C" arrives home and retrieves the T-shirt to find out that it is too small. Consumer "C" wants to take advantage to the Satisfaction or Return Policy. In this instance, consumer "C" completes a "Return Notification" online, for example, via their communication device 28, and produces a return slip that is attached to the package by consumer "C". The return notification states the nearest logistics facility 10 as calculated by the system as the point of return. Consumer "C" takes the returned goods to the nearest logistics facility 10 for a "scan-in" and subsequent return to the vendor 18. Alternatively, the logistics facility 10 to which the goods are returned can be the most convenient logistics facility for a customers proposed journey, i.e. a drop off point, as described above. A similar procedure can also be adopted in cases where the goods are undeliverable and need to be returned to the logistics facility and ultimately the vendor 18.

Consumers "A", "B", and "C" above live in different suburbs of the same city all within 1 kilometer from a common point along their travels. The common point is the chosen logistics facility 10. In this instance, any of the individual consumers can stop at the logistics facility 10 to pick up their goods. One choice is from the drive-through/up window 14 of the logistics facility 10. Alternatively, consumers can walk inside, collect the goods and perhaps pick-up additional items for sale at the logistics facility 10. If requested, the logistics facility 10 will make the local deliveries, as required.

Consumer "D" orders a somewhat valuable item from a first website, a bunch of groceries and perishables from a second website, and several items of clothing from a third website. When placing the order, consumer "D" nominates the nearest logistics facility 10 for collection, or allows the system to calculate the nearest logistics facility 10, or requests home delivery.

The logistics facility 10 receives several orders that day from a variety of online suppliers, as well orders received online for their own stock. The logistics facility 10 sorts the orders into customer names, ensuring that all orders for the one customer are consolidated into one consignment. The logistics facility 10 picks and packs all the orders received online for their own stock. The logistics facility 10 consolidates the orders received for their own stock with other orders received for the same customers. The logistics facility 10 sorts all the orders available into ones for delivery, and ones for pick up. The logistics facility 10 notifies all customers with pending orders of the arrival of their stock. Once customers respond with the delivery or pick-up time windows, the logistics facility 10 can begin the necessary arrangements with their delivery service 24 and drive through/up area 14 as applicable.

As most convenience stores currently work 24 hours per day, 7 days per week, consumer "D" will be able to collect his or her goods at almost any time. In some embodiments, the logistics facility 10 will be able to allocate cut-off times for deliveries. However, this is still likely to be more favourable to consumers than the current 9-5, Monday to Friday options and with fewer or no additional charges.

It will be appreciated that embodiments of the present invention can be implemented using one or more processors operatively coupled to respective storage media in the form of computer memory. Computer memory comprises a computer readable medium having computer readable program code components stored thereon, at least some of which are selectively executed by the one or more processors and are configured to cause the execution of the embodiments of the present invention described herein.

Hence embodiments of the present invention address or at least ameliorate one or more of the aforementioned problems of the prior art by providing a logistics facility 10 in a modified local outlet, such as a modified convenience store, petrol station, fishing tackle store, shoe repair store, key cutting shop or other local outlet comprising a counter or checkout for purchasing goods and/or services offered for sale at the facility, a drive through or drive up area 14 for the collection of goods from the facility and/or for the ordering of services, a storage facility 16 for receiving, consolidating and/or cross-docking goods ordered from the facility 10 and/or goods ordered from a plurality of other vendors 18 by customers 20 over a communications network 22. Logistics facility 10 also comprises a delivery service 24 for the delivery of goods to destinations specified for the customers and a returns facility for receiving goods that consumers wish to return after purchase or for receiving goods that are undeliverable to the customer for any reason, such as incorrect delivery details, no access to premises etc.

Customers will have the choice of picking up their goods that were ordered online from the drive-through/up window/ area 14 or request the local logistics facility 10 to deliver the goods to their home. With the close locale, the ability to rendezvous with the customer is less likely to be a hit and miss affair. Delivery distances are shorter compared to the prior art resulting in lower delivery costs and reduced pollution. If delivery is requested, but the customer is not available to receive the delivery, the goods only need to be returned a short distance to the local logistics facility 10. In other words, the logistics facility 10 is also a distribution centre. Hence, the local convenience store, petrol station or other local outlet modified in accordance with the present invention becomes a central point for the last mile logistics. Orders from different sources for the one customer are combined and delivered to the customer or left for collection by the customer.

Furthermore, convenience stores, petrol stations or other local outlets modified in accordance with the present invention have a new revenue stream for the added value work of: consolidating different parcels from different sources for the one customer; picking and packing small orders from their own stock for their local customers; delivering goods to customers within their locale; handling returns on behalf of the different delivery services that use their facilities; expanded product range to take advantage of the online ordering capacity.

In this specification, the terms "comprise", "comprises", "comprising" or similar terms are intended to mean a non-exclusive inclusion, such that a system, method or apparatus that comprises a list of elements does not include those elements solely, but may well include other elements not listed.

Throughout the specification the aim has been to describe the preferred embodiments of the invention without limiting the invention to any one embodiment or specific collection of features. It is to be appreciated by those of skill in the art that various modifications and changes can be made in the particular embodiments exemplified without departing from the scope of the present invention.

The invention claimed is:

1. A selected modified local outlet for delivering to a customer (i) goods from a core range of products carried by the selected modified local outlet; (ii) goods from a further-extended range of products that can be unrelated to the core range of products; and (iii) goods that have been ordered directly by the customer over a communications network from one or more of a plurality of other vendors unrelated to the selected modified local outlet, the selected modified local outlet comprising:
  a storage facility for receiving and storing the (i) goods; (ii) goods; and (iii) goods,
    wherein the (i) goods comprise perishable goods and non-perishable goods from a core range of products that are carried for daily consumption at an availability that is order today, deliver today at the selected modified local outlet for purchase by the customer;
    the (ii) goods comprise goods from a further-extended range of products that have been ordered directly by the customer over said communications network wherein the (ii) goods have an availability that is order today, deliver tomorrow; and
    the (iii) goods have been ordered directly by the customer over said communications network from the one or more of a plurality of other vendors wherein the (iii) goods ordered directly by the customer include the selected modified local outlet as a destination specified by the customer;
    the storage facility including a temperature controlled area for storing the perishable goods;

a counter or checkout at which the goods (i), (ii) and (iii) are received from the storage facility and delivered to the customer; and one or both of:
- a drive through or drive up area at which the goods are received from the storage facility and delivered to the customer; and
- a delivery service, via which the goods from the storage facility are delivered to destinations specified for the customer, wherein the selected modified local outlet is selected to be a collection point that creates the least deviation from a route input by the customer on their communication device, wherein the selected modified local outlet is selected from a plurality of modified local outlets serving their local surrounding area, wherein the automatic calculation is performed by a processor coupled to be in communication with a website or other suitable interface over a communications network for receiving orders for the (ii) goods and the (iii) goods from a customer via their communication device.

2. The selected modified local outlet of claim 1, wherein the selected modified local outlet is a modified convenience store, shop, petrol station, fishing tackle shop, shoe repair store or key cutting store.

3. The selected modified local outlet of claim 1, further including a quarantine area for storing returned or undeliverable goods.

4. The selected modified local outlet of claim 1, wherein the selected modified local outlet comprises a website or other suitable interface for receiving the orders from the customer over the communications network for goods (ii) and goods (iii) provided by the selected modified local outlet and/or the one or more of a plurality of other vendors.

5. A method for delivering to a selected modified local outlet (i) goods from a core range of products carried by the selected modified local outlet; (ii) goods from a further-extended range of products that can be unrelated to the core range of products; and (iii) goods that have been ordered directly by a customer over a communications network from one or more of a plurality of other vendors unrelated to the selected modified local outlet, the method comprising:

providing the (i) goods from a core range of products that are carried for daily consumption at an availability that is order today, deliver today at the selected modified local outlet for purchase by the customer;

automatically calculating the selected modified local outlet to be a collection point that creates the least deviation from a route input by the customer on their communication device, wherein the selected modified local outlet is selected from a plurality of modified local outlets serving their local surrounding area, wherein the automatic calculation is performed by a processor coupled to be in communication with a website or other suitable interface over a communications network for receiving orders for the (ii) goods and the (iii) goods from the customer via their communication device;

receiving at the selected modified local outlet the (ii) goods from a further-extended range of products that have been ordered directly by the customer over the communications network wherein the (ii) goods have an availability that is order today, deliver tomorrow; and receiving at the selected modified local outlet the (iii) goods ordered directly by the customer over the communications network from the one or more of a plurality of other vendors wherein the (iii) goods ordered directly by customer include the selected modified local outlet as a destination specified by the customer; and providing at the selected modified local outlet the (i) goods from a core range of products; the (ii) goods from a further-extended range of products; and the (iii) goods that have been ordered directly by the customer over a communications network to the customer.

6. The method of claim 5, wherein the selected modified local outlet is a modified convenience store, shop, petrol station, fishing tackle shop, shoe repair store, key cutting store or other business.

7. The method of claim 5, wherein the selected modified local outlet receives the (i) goods from the one or more of the plurality of other unrelated vendors in singular or break-bulk form.

8. The method of claim 5, further including one or more of the following: storing perishable goods in a temperature controlled area of the selected modified local outlet; storing returned or undeliverable goods in a quarantine area of the selected modified local outlet.

9. The method of claim 5, wherein the (ii) goods from a further-extended range of products are ordered from a website or other suitable interface of the selected modified local outlet or from websites of the vendors that provide the (ii) goods from a further-extended range of products.

10. The method of claim 5, further comprising the step of automatically calculating a modified local outlet that is located nearest to a destination specified for delivery.

11. The method of claim 5, wherein the providing of the (i); (ii); and (iii) goods comprises collection from the selected modified local outlet or delivery to one or more destinations specified by the customer.

12. The method of claim 5, further comprising the step of:
providing a communication to the customer to notify that the (iii) goods ordered directly by the customer over the communications network from the one or more of a plurality of vendors have been received at the selected modified local outlet.

13. The method of claim 5, wherein the (iii) goods that have been ordered directly by the customer over a communications network from one or more of a plurality of other vendors unrelated to the selected modified local outlet are consolidated at a storage facility of the selected modified local outlet for the customer.

14. The method of claim 5, wherein the orders directly by the customer over the communications network for goods (ii) comprise destinations specified by the customer for delivery.

15. The method of claim 14, further comprising the steps of:
receiving at the selected modified local outlet, from the communication devices of the customer, orders for delivery of the goods (i) from a core range of products, wherein the orders for the goods (i) comprise destinations specified by the customer for delivery;

cross-docking, at the selected modified local outlet, the (ii) goods from a further-extended range of products and the (iii) goods ordered directly by the customer over the communications network from the one or more of a plurality of other vendors, and consolidating the (i) goods from a core range of products; the (ii) goods from a further-extended range of products; and the (iii) goods ordered directly by the customer over a communications network from one or more of a plurality of other vendors; and delivering the consolidated (i); (ii) and (iii) goods, via a delivery service of the selected modified local outlet, from the selected modified local outlet to the destinations specified by the customer.

16. The method of claim 5, further comprising the step of:
receiving the (iii) goods, for return to the one or more of a plurality of other vendors, from the customer via any of the following:
a counter or checkout of the modified local outlet;
a drive through or drive up area of the modified local outlet; or
a delivery service.

17. A logistics system for delivering to a customer (i) goods from a core range of products carried by a selected modified local outlet; (ii) goods from a further-extended range of products that can be unrelated to the core range of products; and (iii) goods that have been ordered directly by the customer over a communications network from one or more of a plurality of other vendors unrelated to the selected modified local outlet, the system comprising:
a selected modified local outlet comprising:
a storage facility for receiving and storing the (i) goods; (ii) goods; and (iii) goods,
wherein the (i) goods comprise perishable goods and non-perishable goods from a core range of products that are carried for daily consumption at an availability that is order today, deliver today at the selected modified local outlet for purchase by the customer;
the (ii) goods comprise goods from a further-extended range of products that have been ordered directly by the customer over said communications network wherein the (ii) goods have an availability that is order today, deliver tomorrow; and
the (iii) goods have been ordered directly by the customer over said communications network from the one or more of a plurality of other vendors wherein the (iii) goods ordered directly by the customer include the selected modified local outlet as a destination specified by the customer;
the storage facility including a temperature controlled area for storing the perishable goods;
a counter or checkout at which the goods (i), (ii) and (iii) are received from the storage facility and delivered to the customer;
one or both of:
a drive through or drive up area at which the goods are received from the storage facility and delivered to the customer;
a delivery service, via which the goods from the storage facility are delivered to destinations specified for the customer;
a website or other suitable interface coupled to be in communication with a server computer over a communications network, the website or other suitable interface and server computer for receiving orders for the (ii); and (iii) goods from the customer via their communication devices; and
a processor coupled to be in communication with the website or other suitable interface over the communications network for selecting the selected modified local outlet to be a collection point that creates the least deviation from a route input by the customer on their communication device, wherein the selected modified local outlet is selected from a plurality of modified local outlets serving their local surrounding area.

18. The system of claim 17, further comprising storing the orders from the customer in a database coupled to be in communication with the selected modified local outlet.

19. The system of claim 17, wherein the server computer comprises a processor for automatically calculating a modified local outlet that is located nearest to the destination specified by the customer for delivery.

20. The logistics system of claim 17, wherein the server computer is for receiving and processing the orders for the (i); (ii); and (iii) goods.

21. The logistics system of claim 17, wherein the server computer automatically calculates a modified local outlet for receiving the (iii) goods for return to the one or more of a plurality of other vendors that creates the least deviation from an entered route.

\* \* \* \* \*